Nov. 3, 1964 Re. 25,675

RENÉE DU BONNETT PREVIOUSLY KNOWN AS RENÉE B. NEAL

LINT REMOVING DEVICE

Original Filed April 10, 1958

INVENTOR.

RENÉE B. NEAL

United States Patent Office

Re. 25,675
Reissued Nov. 3, 1964

25,675
LINT REMOVING DEVICE

Renée du Bonnet, previously known as Renée B. Neal, 906 Park Ave., Apt. 3, New York, N.Y.

Original No. 3,056,154, dated Oct. 2, 1962, Ser. No. 727,569, Apr. 10, 1958. Application for reissue Oct. 1, 1963, Ser. No. 313,137
2 Claims. (Cl. 15—104)

Matter enclosed in heavy brackets [ ] appears in the original patent but forms no part of this reissue specification; matter printed in italics indicates the additions made by reissue.

This invention relates to devices for removal of dandruff, dirt, ravellings, animal and human hairs and other foreign substances from various surfaces and it consists in the constructions, arrangements and combinations herein described and claimed.

It is an important object of the invention to provide a mitten or glove-like base member from any suitably shaped flexible material such as paper or fabric, an adhesive layer of approximately corresponding shape to said flexible sheet being superposed upon one side of said flexible sheets, said sheets being secured along three edges to define a hand-receiving opening.

It will be understood that the term "flexible sheet material" as used in the specification and claim of this application includes flexible paper, fabric, plastic or any other composition sheet material.

Another salient objective of this invention is to provide a substantial improvement over existing lint and dirt removing devices embodying mechanical devices such as rollers and daubers used for application and operation inasmuch as mechanical devices cannot conform with varied forms and surfaces.

More specifically, I have chosen a mitten or glove design for providing a flexible base member, so as to permit greater manipulatability in permitting the user to utilize the natural movements of the hand in a patting or wiping action for hard to get to areas, such as folds, crevices, pleats, and so forth, in garments and other articles.

Additional objects, advantages and features of invention will be apparent from the following description, considered in conjunction with the accompanying drawings, wherein, FIGURE 1 is a top plan view of a glove having the pads secured upon the palm and finger stalls of the glove.

Figure 1:
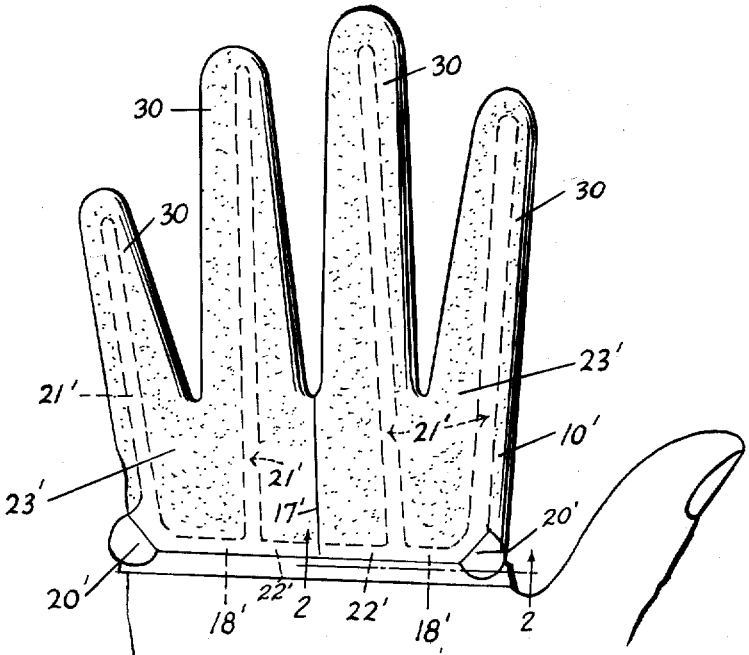
Figure 2:
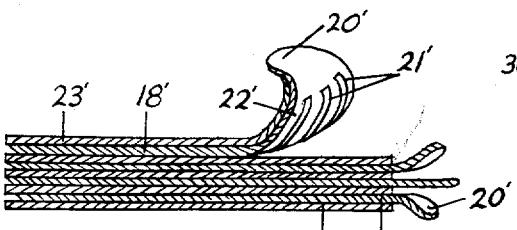
FIGURE 2 is a cross section on the line 2—2 of FIGURE 1, the top sheet and reinforcing being shown as partially removed.

Attention is first invited to FIGURES 1 and 2 of the drawings, wherein a mitten or glove-like cleaning accessory is shown and generally indicated by the reference character 10′. The accessory may be constructed from any suitable flexible material, such as paper or fabric.

The construction shown in FIGURE 1, illustrates a form as applied to a glove and comprises laminated pads 23′ which are provided with palm portions having elongated extensions 30 overlying the finger stalls of the glove 10′. The reinforcing members 18′ include strips 21′ and a horizontal strip 22′ the former extending lengthwise of the finger stalls, and, of course, each reinforcing member will have a pull tab 20′. The laminated pads 23′ will be in abutting relation along the line 17′.

Inasmuch as the maximum tensile strength of adhesive faced materials may vary from a low degree, such as aforementioned, and due to a manufacturing choice of materials of different weights, thicknesses and tensile strengths, it is contemplated that the length of the reinforcing strips can be made shorter if desired. It is further contemplated that said reinforcing strips can also be made of varying widths, and that in using a stronger material, the tab and reinforcing form can be provided by an edge of each sheet of adhesive self material being folded back upon itself to form a finger grip.

Figure 3:
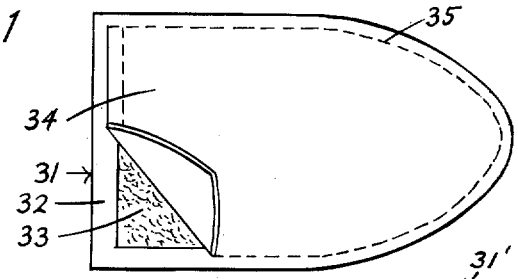
FIGURE 3 is a plan view of a form of the device constructed as a mitten, having a portion of a protective sheet partially removed to expose an adhesive sheet.

In FIGURE 3, there is shown a simple construction of laminated mitten 31, which comprises a pair of suitably shaped flexible sheets, upon the upper face 32 of one of the sheets, an adhesive surface 33 is positioned. A removable protective sheet 34 having a contour approximately corresponding to the adhesive surface 33 or the sheets forming the mitten 31 is removably secured.

The sheets thus assembled are stitched or otherwise secured along three edges thereof, as indicated at 35, leaving the plastic sheets forming the mitten open for admission of the hand of a user.

In the use of this form of the device, the protective sheet 34, is preferably formed from a material which can be readily peeled therefrom so as to expose a portion of the adhesive sheet 33, the exposed portion being employed to pick up foreign matter from a surface to be cleaned. After cleaning of the surface the torn portion of the protective sheet may be returned to its original position so that the mitten may be readily carried in a purse or otherwise.

Figure 4:
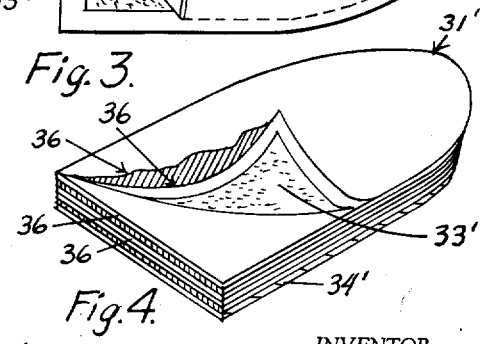
FIGURE 4 is a perspective view of the preferred form of the device constructed as a stack of mittens, wherein each mitten functions as a self protective device, and as a protective covering for the adjacent mitten.

In FIGURE 4, there is shown the preferred form of the device, constructed as a stack of flexible mittens, wherein the necessity of providing a protective sheet for each adhesive surface of each of said mittens is eliminated. Each of said mittens is constructed as a laminated mitten 31′, comprising a pair of suitably shaped flexible sheets forming a hand receiving base member, the adhesive layer 33′ being presented downwardly, being removably secured to and protected by the top sheet of the adjacent mitten. In this construction of a plurality of mittens, a protective sheet 34′ need only be disposed on the adhesive surface of the bottom or the last mitten to be used.

While I have shown and described preferred forms of the invention, this is by way of illustration only, and I consider as my own all such modifications in construction as fairly fall within the scope of the appended claims.

I claim:

*1.* In a lint removing accessory, a stack of at least two laminated mittens, each mitten comprising a pair of suitably shaped flexible sheets, an adhesive layer of approximately corresponding shape to said flexible sheet superposed upon one of said flexible sheets, the adhesive surface of said layer being presented downwardly, the said sheets of each of said mittens being secured along three edges thereof to define a hand receiving opening, the adhesive surfaced layer of the top one of said mittens being removably secured to and protected by the top sheet of the adjacent mitten.

2. *A disposable lint remover for lifting off and removing foreign particles and lint from a surface to be cleaned, comprising a mitten-like base member adapted to surround a portion of the hand including the tips of fingers thereof, said member being formed of flexible sheet material and having opposed spaced sheet portions joined to each other only at the sides and one end, said one end being narrowed to conform to the fingers of the user, one of said portions having a layer of adhesive adhered to the major portion of the outer surface thereof, and a protective covering which is separate and separable from the base member overlying said adhesive layer and strippably adhered thereto, said protective covering having substantially the same shape as the base member, the lint remover remaining substantially flat before, during and after use.*

References Cited by the Examiner

The following references, cited by the Examiner, are of record in the patented file of this patent or the original patent.

UNITED STATES PATENTS

| | | | |
|---|---|---|---|
| 1,756,408 | 4/30 | Walker et al. | |
| 2,528,602 | 11/50 | Magit. | |
| 2,715,493 | 8/55 | Vogt | 206—57 |
| 2,715,742 | 8/55 | Coles. | |
| 2,724,847 | 11/55 | Krasno. | |
| 2,913,745 | 11/59 | Welvang | 15—104 |

FOREIGN PATENTS

| | | |
|---|---|---|
| 1,000,725 | 10/51 | France. |

CHARLES A. WILLMUTH, *Primary Examiner.*